(12) United States Patent
Kajitani et al.

(10) Patent No.: US 8,676,560 B2
(45) Date of Patent: Mar. 18, 2014

(54) SIMULATION METHOD, SYSTEM AND PROGRAM FOR SIMULATING PHYSICAL UNIT CONTROLLED BY ELECTRONIC CONTROL UNIT

(75) Inventors: Koichi Kajitani, Kanagawa-ken (JP);
Hideaki Komatsu, Kanagawa-ken (JP);
Shuichi Shimizu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 12/481,105

(22) Filed: Jun. 9, 2009

(65) Prior Publication Data

US 2009/0306952 A1      Dec. 10, 2009

(30) Foreign Application Priority Data

Jun. 9, 2008   (JP) ................................. 2008-151047

(51) Int. Cl.
*G06F 17/50*   (2006.01)
*G06F 9/455*   (2006.01)
*G06G 7/62*    (2006.01)

(52) U.S. Cl.
USPC ................... 703/17; 703/13; 703/23; 703/24; 703/25

(58) Field of Classification Search
USPC ............................. 703/13, 23, 8, 7, 17, 25, 24
See application file for complete search history.

(56) References Cited

U.S. PATENT DOCUMENTS

| | | | |
|---|---|---|---|
| 5,987,243 A | 11/1999 | Aihara | |
| 6,243,629 B1 * | 6/2001 | Sugimoto et al. | 701/29 |
| 6,574,734 B1 * | 6/2003 | Colson et al. | 726/21 |
| 2005/0245351 A1 * | 11/2005 | Yamada et al. | 477/110 |
| 2007/0192076 A1 * | 8/2007 | Boutin | 703/13 |
| 2009/0187390 A1 * | 7/2009 | Urano | 703/7 |

FOREIGN PATENT DOCUMENTS

| | | |
|---|---|---|
| JP | 6-161987 | 6/1994 |
| JP | 11-014507 | 1/1999 |
| JP | 2001-331346 | 11/2001 |
| JP | 2002312712 A | 10/2002 |
| JP | 2003-316603 | 11/2003 |

(Continued)

OTHER PUBLICATIONS

Albrecht, A. et al., "Towards a Stronger Simulation Support for Engine Control Design: A Methodological Point of View", 2007, Oil & Gas Science and Technology, Institut francais du petrole, pp. 438, 439, 441, 447).*

(Continued)

*Primary Examiner* — David Silver
*Assistant Examiner* — Cedric D Johnson
(74) *Attorney, Agent, or Firm* — Gail H. Zarick; Otterstedt, Ellenbogen & Kammer, LLP

(57) ABSTRACT

In a normal operation, a physical unit simulator is allowed to speculatively perform high-speed continuous execution. Only when an actual input comes in, a speculative input and the actual input are compared with each other. Thereafter, in response to inconsistency between the inputs, the physical unit simulator is returned to a point closest to the point of the actual input and is allowed to execute a variable step module to reach the point of the actual input. Upon arrival at the point of the actual input, the simulator is shifted back to the high-speed continuous execution from there. Thus, a processing speed of the simulator can be significantly improved.

11 Claims, 12 Drawing Sheets

(56) References Cited

FOREIGN PATENT DOCUMENTS

| | | |
|---|---|---|
| JP | 2007052580 A | 3/2007 |
| JP | 2008-001261 | 1/2008 |
| JP | 2008-084121 | 4/2008 |

OTHER PUBLICATIONS

Shao, Hui, "Design of a Simulation Framework for Automotive Networks Using SystemC", Jun. 30, 2007, pp. (11-17, 33-42, 51, 52, 63).*

Beckstein, C. et al., "An Integration of Object-Oriented Knowledge Representation and Rule-Oriented Programming as a Basis for Design and Diagnosis of Technical Systems", 1988, Annals of Operations Research 16.*

Erkkinen, Tom, et al., "Automatic Code Generation—Technology Adoption Lessons Learned from Commercial Vehicle Case Studies", 2007, Mathworks, Inc.*

Quaglia, Francesco et al., "Software Supports for Preemptive Rollback in Optimistic Parallel Simulation on Myrinet Clusters", 2002, IEEE.*

Fujimoto, Richard M., "Parallel Discrete Event Simulation", Oct. 1990, Communications of the ACM, vol. 33, No. 10.*

Gustafsson, Thomas, "Maintaining Data Consistency in Embedded Databases for Vehicular Systems", 2004, Department of Computer and Information Science, Linkopings University.*

Umamageswaran, Kothanda et al., "Formal Verification and Empirical Analysis of Rollback Relaxation", May 5, 1997, Elsevier.*

Rabbath, C.A. et al., "Effective Modeling and Simulation of the Internal Combustion Engine Control Systems", Jun. 25-27, 2001, Proceedings of the Americal Control Conference.*

Fleisch, Wolfgang, "Simulation and Validation of Component-Based Automotive Control Software", Sep. 28-30, 2000, In Proceedings of the 12th European Simulation Symposium.*

V. Aho, Ravi Sethi, Jeffrey D. Ullman, "Compilers Principles, Technologies, and Tools", Addison-Wesley Publishing Company, 1986, pp. 608-633.

Hideyuki Kagami et al., "A Study of Parallel Discrete Event Simulator using Advance Processing" IPSJ SIG Technical Report 96-DPS-77, vol. 96, No. 63, pp. 67-72.

Yukinori Matsumoto et al., "Parallel Logic Simulation Virtual Time" Trans IPS. Japan, vol. 33 No. 3, pp. 6-182 through 6-183 (abstract machine translation).

* cited by examiner

| TIME STAMP | INPUT EVENT | OUTPUT EVENT | INTERNAL STATE | DETERMINATE |
|---|---|---|---|---|
| $t_1$ | - | - | $s_1$ | yes |
| $t_2$ | - | - | $s_2$ | yes |
| $t_3$ | $e_3$ | - | $s_3$ | yes |
| $t_4$ | - | $o_4$ | $s_4$ | yes |
| $t_5$ | - | - | $s_5$ | yes |
| $t_6 = T$ | - | - | $s_6$ | yes |
| $t_7$ | - | - | $s_7$ | no |
| $t$ | $e$ | - | - | no |
| $t_8$ | - | - | $s_8$ | no |
| $t_9$ | $e_9$ | - | $s_9$ | no |
| $t_{10}$ | - | $o_{10}$ | $s_{10}$ | no |
| $t_{11}$ | - | - | $s_{11}$ | no |
| | | | | CANCEL |

SIMULATION METHOD, SYSTEM AND PROGRAM FOR SIMULATING PHYSICAL UNIT CONTROLLED BY ELECTRONIC CONTROL UNIT

CROSS-REFERENCE TO RELATED APPLICATION

This application claims priority, under 35 U.S.C. §119, from Japanese Patent Application No. 2008-151047 filed Jun. 9, 2008 and from Japanese Patent Application No. 2008-158995 filed Jun. 18, 2008, the entire contents of both are being incorporated herein by reference.

BACKGROUND OF THE INVENTION

The present invention relates to the testing of an electronic control unit (ECU) and a physical unit which are used in an automobile and the like. More particularly, the present invention relates to software-based testing and emulation of multiple ECUs and to the software-based testing of a physical unit simulator.

An automobile, in its early stage, that is the early 20th century, was composed of: an engine as a power source; and mechanical parts including a brake, an accelerator, a steering wheel, a transmission and a suspension, including almost no electrical mechanisms except for an ignition plug for the engine and a headlight.

However, around the 1970s, there arose the need to efficiently control the engine in preparation for air pollution, oil crisis and the like. Thus, an ECU started to be used for engine control. The ECU generally includes: an input interface for executing, for example, A/D conversion of an input signal from a sensor; a logic operation part (microcomputer) for processing a digital input signal according to a predetermined logic; and an output interface for converting the result of the processing into an actuator operating signal.

A significant proportion of a recent automobile is now occupied not only by the mechanical parts but also by electronic parts and software. This includes such examples as control systems for the engine and the transmission, an anti-lock breaking system (ABS), electronic stability control (ESC) and power steering, wiper control, a security monitoring system and the like. A development cost for the electronic parts and software is said to be 25% or 40% of the total and accounts for 70% in a hybrid car.

Multiple ECUs are arranged to perform electronic control. The ECUs are connected to each other through an in-vehicle network, for example, a controller area network (CAN). Moreover, the engine, the transmission and the like, which are objects to be controlled, are connected directly to the respective ECUs through wirings.

The ECU is a small computer and operated according to an interrupt from a sensor input or the like. Meanwhile, the engine and other mechanical systems continuously execute mechanical operations. In other words, a computer digital system and a mechanical physical system execute cooperative operations in parallel in a single system such as an automobile. Naturally, software supporting those operations has become more and more complicated. Thus, there is an urgent need to achieve a mechanism not only for verifying the operations of a single ECU but also for verifying the operations of multiple ECUs at the same time.

Here, examples of the sensor for inputting signals to the ECU include: a temperature sensor for measuring an engine temperature and the like; a pressure sensor for estimating a pressure sucked into the engine; a throttle position sensor for measuring a stepping amount of an accelerator pedal; a steering angle sensor; a vehicle height sensor; a rotation speed sensor; a knock sensor; an acceleration sensor; a flow rate sensor; an oxygen sensor; a lean air fuel ratio sensor; and the like.

Meanwhile, examples of actuators driven by an output signal coming from an ECU include an electromagnetic solenoid, a motor and the like. The solenoid is used, for example, for an injector of the engine, shift control of the transmission, brake valve control, door lock and the like.

The motor is used mainly as a servo mechanism for a starter of the engine, fuel control of the engine, a brake hydraulic pump, steering angle control, steering wheels, wipers, power windows, seat belts, air bags, and the like.

A technique that has been used for such testing is called "hardware in the loop simulation" (HILS). Particularly, an environment for testing all the ECUs in the automobile is called a full-vehicle HILS. In the full-vehicle HILS, a test is conducted in a laboratory according to a predetermined scenario by connecting an actual ECU to a dedicated hardware device for emulating an engine, a transmission mechanism and the like. An output from the ECU is inputted to a monitoring computer and further displayed on a display. Thus, an operator conducting the test checks if there is any abnormal operation while looking at the display.

However, in the HILS, the dedicated hardware device is used and physical wiring connection between the device and the actual ECU is required. Thus, preparation is time intensive. Moreover, when a test is conducted by replacing the ECU with another one, the device and the ECU have to be physically reconnected to each other, thus requiring even more time. Furthermore, since the test uses the actual ECU, it takes actual time to conduct the test. Therefore, it takes large amounts of time to test many scenarios. Moreover, the hardware device for emulation of the HILS is generally very expensive.

Therefore, a technique of testing by using software configuration without using the expensive hardware device for emulation was developed. This technique is called "software in the loop simulation" (SILS), in which all components to be installed in the ECU, such as a microcomputer, an I/O circuit and control scenarios, are configured by use of a software simulator. According to the SILS, a test can be executed without the hardware of the ECU.

Here, description will be given of an example where an ECU emulator and a physical unit simulator, particularly an engine simulator, operate in cooperation with each other. Note that, for convenience, operations of the ECU emulator and the engine simulator will be described below as operations of an actual ECU and an actual engine. First, at 30 degrees before a piston reaches a top dead center with the rotation of a crankshaft, the engine generates an interrupt to the ECU. Upon receipt of the interrupt, the ECU calculates fuel injection timing and gives an injection instruction at the calculated timing. Upon receipt of the instruction, the engine injects a fuel and subsequently calculates movement of a crank rotated by inertia. Thereafter, when the piston reaches 30 degrees before the top dead center again, the engine generates an interrupt to the ECU to notify the ECU of the fact. Then the ECU calculates ignition timing and gives an instruction to the engine at the timing. In response to the instruction, the engine explodes the fuel inside a cylinder and starts to calculate new rotation movement. Such operations are repeatedly executed.

Such alternating operations of the engine and the ECU are considered as a critical path. Thus, when discrete events in the automobile are simulated in parallel, the presence of such a critical path inhibits sufficient parallelism from the viewpoint of computational performance. Therefore, in the full-vehicle HILS using a computer of a multiprocessor system, even if individual CPUs are assigned to multiple ECU emulators, respectively these CPUs can only exert the performance nearly equivalent to that produced by a single CPU serially calculating the multiple ECU emulators and an engine emulator in the worst case scenario.

One of the simplest methods for consistently operating multiple logical processes in parallel is to operate each of the logical processes according to overall commands. However, this method requires synchronization processing even when no event such as an interrupt is generated. Thus, a processing load is increased and the processing is slowed down.

In discrete event simulation for asynchronously operating the multiple logical processes in parallel, communication between the processes is performed by transmitting and receiving messages of events with timestamps. In this event, as the timestamp, a common time in the entire simulation system is recorded. Here, such a time is called a simulation clock. For each of the logical processes, it is independently determined at which point of the simulation clock the processing is performed. The points where the processing is performed do not always have to coincide with each other. However, when the logical processes perform the processing in cooperation with each other, the logical processes are required to perform the processing in the order of the timestamps. As long as the processing is carried on as described above, the processing can be carried on in the same manner as the case of serial processing of the entire system.

As one example of asynchronous processing, there is conservative synchronization. In this method, events are always processed in the chronological order of timestamps.

An example of the conservative synchronization will be described. It is assumed that a certain logical process has queues from two upstream processes. An event with a time $t_1$ and an event with a time $t_2$ have arrived in one of the queues. The time $t_1$ is older than the time $t_2$. Moreover, nothing has arrived in the other queue. In this case, the logical process is supposed to process the events sequentially from the event with the time $t_1$. However, an event with a time older than the time $t_1$ may arrive in the other queue from upstream. In other words, it is not guaranteed that the time $t_1$ is the oldest. Thus, the processing cannot be carried on. Particularly, in a configuration having a transmission-reception loop between the logical processes, such a configuration may cause deadlock.

In order to avoid such a situation, there is a known method using a null message. In this method, in order to indicate that the upstream logical process does not generate any event until a certain time, a null message having the time is sent to a downstream logical process. Such a time is called a lower bound on the timestamp (LBTS). Upon receipt of such a null message, the downstream logical process can carry on the processing by comparing the timestamp of the event that has arrived with the LBTS and regarding an event with a timestamp older than the LBTS as determinate.

Additionally, there is a known method using no null message called optimistic synchronization. In this method, processing is executed on the assumption that, when a certain logical process has queues from two upstream processes, an event with a time $t_1$ and an event with a time $t_2$ have arrived in one of the queues and the time $t_1$ is older than the time $t_2$ and when nothing has arrived in the other queue, the event with the time $t_1$ is tentatively set as the oldest. Thereafter, when an event with a time older than the time $t_1$ arrives in the other queue, a series of processing starting from the event with the time $t_1$ is sequentially cancelled by sending a reverse message. Subsequently, a new event with a time older than the time $t_1$ is processed. In this method, the events to be outputted from the logical process are temporarily not necessarily in the order of the timestamps. However, those events are guaranteed to be finally set in the order of the timestamps by rollback.

By use of the methods as described above, the events can be transmitted in a correct order while avoiding the deadlock. However, such methods still cannot avoid serialization of processing. Thus, the processing still cannot be speeded up.

Japanese Patent Application Publication No. Hei 6-161987 is directed to implementation of artificial ECU hardware and thus enable real machine evaluation by software, and discloses simulation of hardware having desired functions by changing over a matrix switch.

Japanese Patent Application Publication No. Hei 11-14507 is directed to enablement of desk verification of logic of an entire vehicle, and discloses a vehicle simulation device including an engine control simulator (ECU) and a vehicle control simulator. The ECU calculates control parameters of an engine model and transmits the result of the calculation to the vehicle control simulator. The vehicle control simulator uses the control parameters sent from the ECU to calculate a state quantity of each part of a vehicle model, and sends the result of the calculation back to the ECU. The vehicle model includes a driver model, an inlet system model, a fuel system model, a combustion system model, an engine temperature estimation model, a drive system model, a catalyst model, an A/F sensor model and a rear $O_2$ sensor model. The driver model has vehicle speed pattern input means for inputting change pattern of a target vehicle speed.

Japanese Patent Application Publication No. 2001-331346 provides a simulator capable of debugging a control program as though a real machine exists, even if the real machine has not been completed yet, and discloses the following. Specifically, control information is written into a memory by a control CPU writes control information into a memory, first. Then, a CPU for simulation reads, through a bus, the control information written into the memory, executes simulation based on the control information, and then writes a result of the simulation is written into the memory through the bus. Subsequently, the control CPU reads the simulation result written into the memory.

Japanese Patent Application Publication No. 2003-316603 relates to a verification system capable of verifying a program without waiting for completion of a real machine device even in the case where program development precedes hardware development of a real machine, and discloses the following. Specifically, in this verification system, a bridge is provided between an ICE debugger supporting specifications of the real machine device and a virtual device for simulating the specifications of the real machine device supporting a new program. Here, the bridge performs conversion processing or the like so as to adapt commands or the like from the virtual device to the ICE debugger.

However, the documents described above make no reference to a technology of synchronization between logical processes.

Japanese Patent Application Publication No. 2008-1261 discloses a data processing device for vehicle control that can be kept always mounted on a vehicle and is capable of performing data collection for development/evaluation and simulation with the following configuration. Specifically, in this data processing device, a data transfer/reception processing part 5 having a multi I/O data buffer function temporarily holds data received by a data receiving part and outputs the data to an I/O terminal part in an initial setting state. Moreover, the data transfer/reception processing part 5 temporarily holds collection result data inputted to the I/O terminal part when the initial setting state is switched to a simulation state by a simulation command. Thereafter, an arithmetic processing part 6 executes a vehicle control operation based on the data temporarily held by the data transfer/reception processing part 5 and outputs vehicle control data as a result of the operation to a bus connection terminal part.

Japanese Patent Application Publication No. 2008-84121 discloses a configuration in which: a plurality of slave management devices SPC each managing environmental conditions of simulation in a simulator for executing predetermined simulation are respectively provided in association with a plurality of simulators SM; and a master management device is connected to all the slave management devices SPC via a network and performs integration management of the environmental conditions of the simulation in the plurality of simulators via the slave management devices.

If the above technologies described are combined, high-speed simulation would still be difficult due to constraint to serial properties of operations in a full-vehicle SILS.

SUMMARY OF THE INVENTION

Accordingly, it is an object of the present invention to allow a simulation system such as the full-vehicle SILS to operate with a higher speed.

It is another object of the present invention to enable efficient utilization of a capacity of a high-performance computer such as a multiprocessor system in the simulation system such as the full-vehicle SILS.

First embodiment of the present invention includes a simulation system for simulating a physical unit controlled by an electronic control unit, the simulation system including:

an electronic control unit emulator for electronically emulating the electronic control unit, which includes an output event having a timestamp; and a physical unit simulator for simulating the physical unit, wherein the physical unit simulator comprises: a fixed step execution processing module for allowing the physical unit simulator to continuously operate for a fixed number of multiple steps; a variable step execution processing module for allowing the physical unit simulator to operate for a variable number of steps; a local scheduler for recording a time of completion, an input event and an internal state variable in a rollback table upon complete execution of the fixed step execution module or the variable step execution module; and a data queue for storing the output event received from the electronic control unit emulator;

wherein the local scheduler (i) compares an output event from the electronic control unit emulator in the data queue having a time older than all other output events in the data queue, with an input event recorded in the rollback table that corresponds to a same time as the time of the output event, and (ii) sets the physical unit simulator back to a point before the time of the output event from the electronic control unit emulator if the output event from the electronic control unit emulator and the input event recorded in the rollback table are inconsistent based on a predetermined number of significant digits;

wherein the variable step execution processing module, operates the physical unit simulator up to the time of the output event from the electronic control unit emulator after the local scheduler sets the physical unit simulator back to the point before the time of the output event from the electronic control unit emulator; and wherein the fixed step execution processing module operates the physical unit simulator after the variable step execution processing module operates the physical unit simulator up to the time of the output event.

Second embodiment of the present invention includes a simulation method for simulating a physical unit controlled by an electronic control unit. The method includes the steps of: operating a physical unit simulator through computer processing continuously for a fixed number of multiple steps; recording, upon completion of the physical unit simulator operating for a fixed number of multiple steps, a time of completion, an input event and an internal state variable in a rollback table in a readable manner through computer processing; receiving at the physical unit simulator the output event, including a time of the output event, from an electronic control unit emulator; and comparing, through computer processing, the output event from the electronic control unit emulator with the input event recorded in the rollback table corresponding to the time of the output event.

If there is an inconsistency to a predetermined number of significant digits between the output event from the electronic control unit emulator and the input event recorded in the rollback table, then performing the steps of: setting the physical unit simulator back to a point before the time of the output event from the electronic control unit emulator; operating the physical unit simulator up to the time of the output event from the electronic control unit emulator; and optionally repeating all steps of the method until a desired extent of simulation is obtained.

Third embodiment of the present invention includes a simulation system for simulating a physical unit system controlled by a plurality of electronic control units. The simulation system includes:

a physical unit system simulator for simulating a plurality of physical units; and a plurality of electronic control unit emulators for electronically emulating a plurality of respective electronic control units each receiving an input event with a time and giving an output event with a time, the output event being inputted to the physical unit system simulator.

Each electronic control unit emulator has (i) a data queue for storing the input event and (ii) means for sequentially recording the input event of the electronic control unit emulator, a timestamp thereof and the output event thereof as a rollback table.

This embodiment also includes means for determining whether or not there is an input event in a queue of an electronic control unit emulator, generating a predicted input event when there is no input event, putting the generated input event in the queue, retrieving the input event, determining whether or not there is an entry corresponding to a timestamp of the input event in the rollback table, tracking back to an entry regarded as determinate in the rollback table when there is no entry, and outputting an output event calculated by the electronic control unit emulator based on an input event of the tracked entry.

Fourth embodiment of the present invention is a simulation method for simulating, by use of a computer, a physical unit system controlled by a plurality of electronic control units.

The method includes the steps of:

simulating, by use of a computer, a physical unit system having a plurality of physical units; and emulating, by use of a computer, a plurality of electronic control units controlling the simulated physical unit system, each electronic control unit thereby receiving an input event with a timestamp, having a queue for storing the input event and giving an output event with a timestamp, wherein the output event is inputted to the simulated physical unit system.

The method can further include:

sequentially recording the input events of an emulated electronic control unit, a timestamp thereof and the output event thereof as a rollback table; determining whether or not there is an input event in the emulated electronic control unit's queue; generating a predicted input event when there is no input event; putting the generated input event in the queue; retrieving the input event when in the queue; determining whether or not there is an entry corresponding to a timestamp of the input event in the rollback table; tracking back to an entry regarded as determinate in the rollback table when there is no entry; outputting an output event calculated by the emulated electronic control unit based on an input event of the tracked entry to a simulated physical unit; and optionally repeating steps of the method until a desired extent of simulation is obtained.

Figure 1:
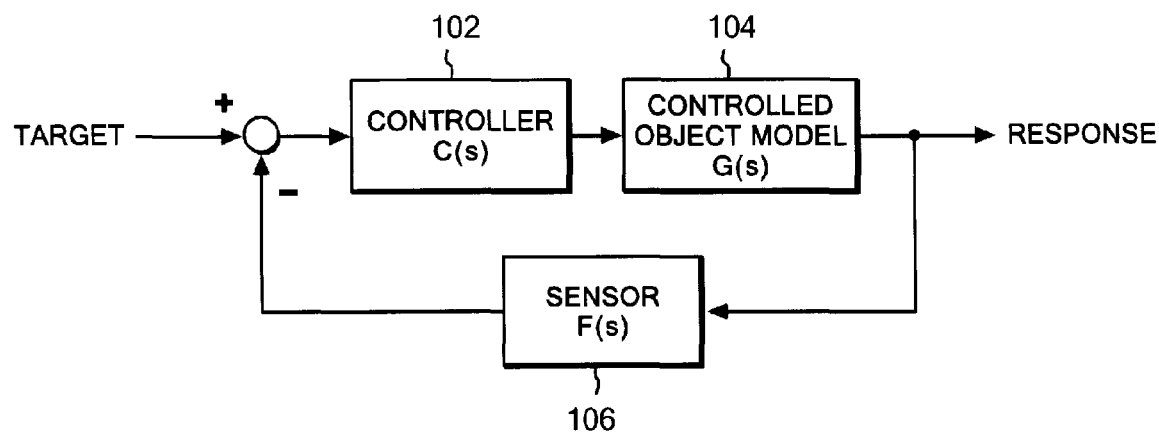
FIG. 1 shows an example of a feedback closed-loop system that is a typical control of an ECU.

For a more complete understanding of the present invention and the advantage thereof, reference is now made to the following description taken in conjunction with accompanying drawings.

DETAILED DESCRIPTION OF THE PREFERRED EMBODIMENT

According to the present invention, a processing speed of the physical unit simulator can be significantly improved by allowing the physical unit simulator to speculatively perform high-speed continuous execution. Only when an actual input comes in, a speculative input and the actual input are compared with each other. Thereafter, in response to inconsistency between the inputs, the physical unit simulator is returned to a point closest to the point of the actual input and is allowed to execute variable steps up to the point of the actual input. Upon arrival at the point of the actual input, the simulator shifts back to the high-speed continuous execution.

According to the present invention, a multi-core CPU station is preferably used. A software emulator is prepared for each ECU. Generally, the software emulator of the ECU is obtained from manufacturer of the ECU. A plurality of software-based physical unit simulators are prepared, which are controlled by outputs from the ECU emulators. The physical unit simulators correspond to an engine, a brake, a drive train, an air conditioner and the like. The ECU emulators and the physical unit simulators are integrated and controlled by a global scheduler.

According to the present invention, a source code of a physical unit simulator is previously analyzed and program codes are looped to generate a fixed step execution module and a variable step execution module.

In execution, the fixed step execution module speculatively executes a fixed number of (for example, 100) steps all at once. For each fixed step, an input, an internal state and an output are stored in a rollback table. The fixed step execution module receives an input from the ECU emulator and, if an input as a result of the speculative execution coincides with the received input, determines that the speculation has been successful and then carries on the processing.

If the input as the result of the speculative execution does not coincide with the received input, the physical unit simulator goes back to a previous time closest to a time stamped on the received input and redoes the calculation from the input and the internal state. After the processing is executed up to the input time by the variable step execution module, the processing is shifted again to the fixed step execution module and then high-speed processing is restarted.

The global scheduler receives outputs from the ECU emulator and the physical unit simulator, updates a determinate time in response to updating of an output with the oldest time among those outputs, and notifies the updated determinate time to the ECU emulator and the physical unit simulator. Thereafter, the global scheduler updates a release table by discarding the outputs with times older than the determinate time.

The software emulator of each ECU is preferably interfaced with a predetermined layer in an operating system of the multi-CPU work station so as to run on the work station. Each of CPUs in the multi-CPU is preferably assigned to the software emulator of each ECU. Thus, each ECU emulator can be independently operated by each CPU. If the number of the CPUs is smaller than the number of the ECUs, multiple ECU emulators are assigned to one CPU. In either case, the operating system assigns one process for each of the ECU emulators. Thus, the respective ECU emulators can perform emulation so as to be operated at unique different clocks. Specifically, the ECU emulators may be heterogeneous ECUs.

As a private memory for internal processing, a part of a memory of the work station is assigned to each of the ECU emulators. Furthermore, the ECU emulator can also access a spot assigned as a shared memory of the work station. Through the shared memory, the ECU emulators can exchange data therebetween, synchronize with each other or communicate with each other. Alternatively, the ECU emulators may be connected through a controller area network (CAN) emulator.

Physical unit simulators such as an engine simulator and a transmission simulator are prepared to receive inputs from the ECU emulators. The physical unit simulators are again connected to the ECU emulators through the shared memory of the work station or the controller area network (CAN) emulator.

According to the present invention, the ECU emulators are speculatively emulated. Specifically, here, it is assumed that the ECU emulators and the physical unit simulators are called logical processes. To execute the logical processes as parallel as possible without creating a critical path, processing is carried on by predicting an input even when no input event has arrived in each of the logical processes. For example, after processing of an event with a timestamp $t_1$ and an event with a timestamp $t_2$, an event with a timestamp $t_3$ is predicted to come based on the previous inputs and processing thereof is previously and speculatively executed.

By such speculative execution, the processing is previously performed without waiting for an output from another logical process. Thus, parallelism of the processing is enhanced. Accordingly, if an actual input to be received later does not coincide with an input in the case of the speculative execution by prediction, the speculative execution is considered to have failed. Thereafter, the state is set back to the previous time and the processing is reexecuted based on the actual input. Note that such speculative execution is particularly effective in discrete event simulation, for example in an automobile, in which input prediction is easy. Thus, the present invention can speed up discrete event simulation by using a speculative simulation technique.

With reference to the drawings, a configuration and processing according to one embodiment of the present invention will be described below. In the following description, unless otherwise noted, the same components are denoted by the same reference numerals throughout the drawings.

Before describing a configuration for achieving the present invention, an ECU and a physical unit will be described as a premise thereof.

The ECU generally includes: an input interface for executing, for example, A/D conversion of an input signal from a sensor; a logic operation part (microcomputer) for processing a digital input signal according to a predetermined logic; and an output interface for converting the result of the processing into an actuator operating signal.

The present invention is next described in connection with an ECU and physical unit for an automobile. However, it should be understood that the present invention is not limited thereto but can be applied to general mechanisms having ECUs, such as, aircrafts and robots.

The ECU uses the sensor to detect a peripheral or environmental state, a state of a drive mechanism (physical unit) such as an engine, and contents of an instruction operation performed by a person, and inputs those detected as signals. Examples of sensors on an automobile include: a water temperature sensor, an inlet temperature sensor, a charging pressure sensor, a pump angle sensor, a crank angle sensor, a vehicle speed sensor, an accelerator position sensor, an A/T shift position, a starter switch, an air conditioner ECU, and the like.

The ECU inputs the signals described above and outputs signals for driving actuators, for example, an electromagnetic spill valve, a fuel cut solenoid, a timing control valve, an intake throttle VSV, a glow plug relay, a tachometer, an air conditioner relay, and the like.

It is possible for one ECU to output driving signals for controlling multiple different mechanisms. However, it is not practical for a single ECU to control multiple mechanisms, such as, the engine and the air conditioner, having different responsiveness and strictness of control of the mechanism. Therefore, an automobile is generally provided with multiple ECUs.

FIG. 1 is a drawing showing an example of a feedback closed-loop system that is a typical control of a system including the ECU and the physical unit. A target signal is inputted to a controller 102 that is the ECU. Thereafter, the ECU performs internal processing of the target signal to output a driving signal and drives a physical unit (plant) 104 such as the engine. In this case, the physical unit is a controlled object model. Subsequently, an output from the plant 104 is fed back to the input to the controller 102 through a sensor 106.

The following parameters are given as the target signal, for example: a throttle opening, an idle control, braking force, a shift, starter ON/OFF, a battery voltage, injection conduction time, the number of times of injection conduction, a deposit, a dwell angle, an advance angle value, an intake completion flag, an ignition completion flag, atmospheric pressure, a vehicle weight, a rolling resistance coefficient, a road gradient, an adhesion coefficient, an intake temperature, and the like.

Then, the throttle opening, an intake pressure, an intake air quantity, the shift, an engine speed, a vehicle speed, an exhaust temperature, $O_2$, a coolant temperature, an air fuel ratio, knock, ignition abnormal and the like are fed back as sensor signals.

The object to be controlled by the ECU is a mechanism system to be solved by a Newtonian mechanics equation, an electrical drive circuit to be solved by a response equation of an electrical circuit, or a combination thereof. These are differential equations and can be described by being transformed into response functions by Laplace transform according to control engineering.

Figure 2:
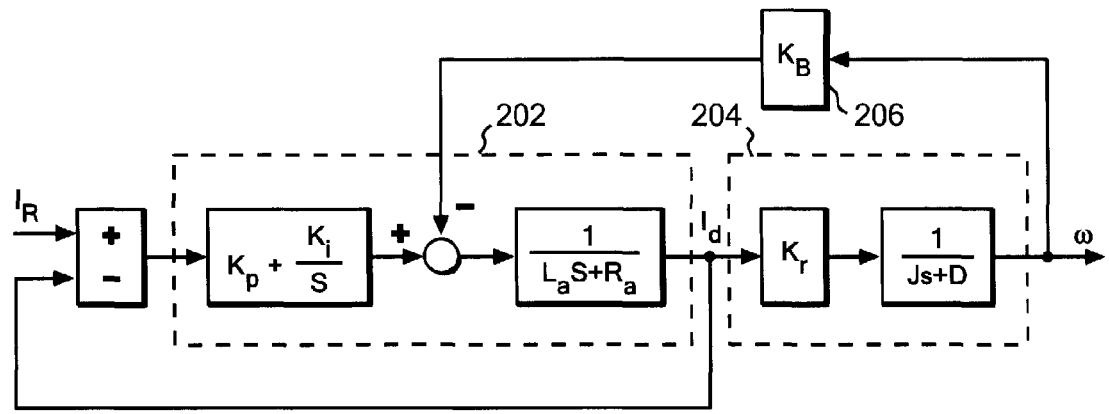
FIG. 2 shows an example of description of the feedback closed-loop system by a response function.

FIG. 2 shows an example of such description by the response function. In FIG. 2, a portion surrounded by a broken line 202 corresponds to the controller 102 in FIG. 1, a portion surrounded by a broken line 204 corresponds to the controlled object model 104 in FIG. 1, and a block 206 corresponds to the sensor 106. Note that it should be understood that FIG. 2 shows an example of an expression by the response function and is not intended to particularly limit the present invention.

For the purpose of testing using a SILS, auto parts manufacturers provide software emulators of ECUs of devices they provide. Specifically, a function as shown in FIG. 2 is realized purely in a software-based manner by an executable program having codes assembled or compiled therein and written in a computer programming language such as assembler or C.

Simulators for the physical units, such as the drive train, the brake, the suspension and the air conditioner, in the SILS are also provided by an automobile manufacturer, an electronics manufacturer and others. These are also realized in a software-based manner by use of a computer program written in a computer programming language such as assembler or C.

Figure 3:
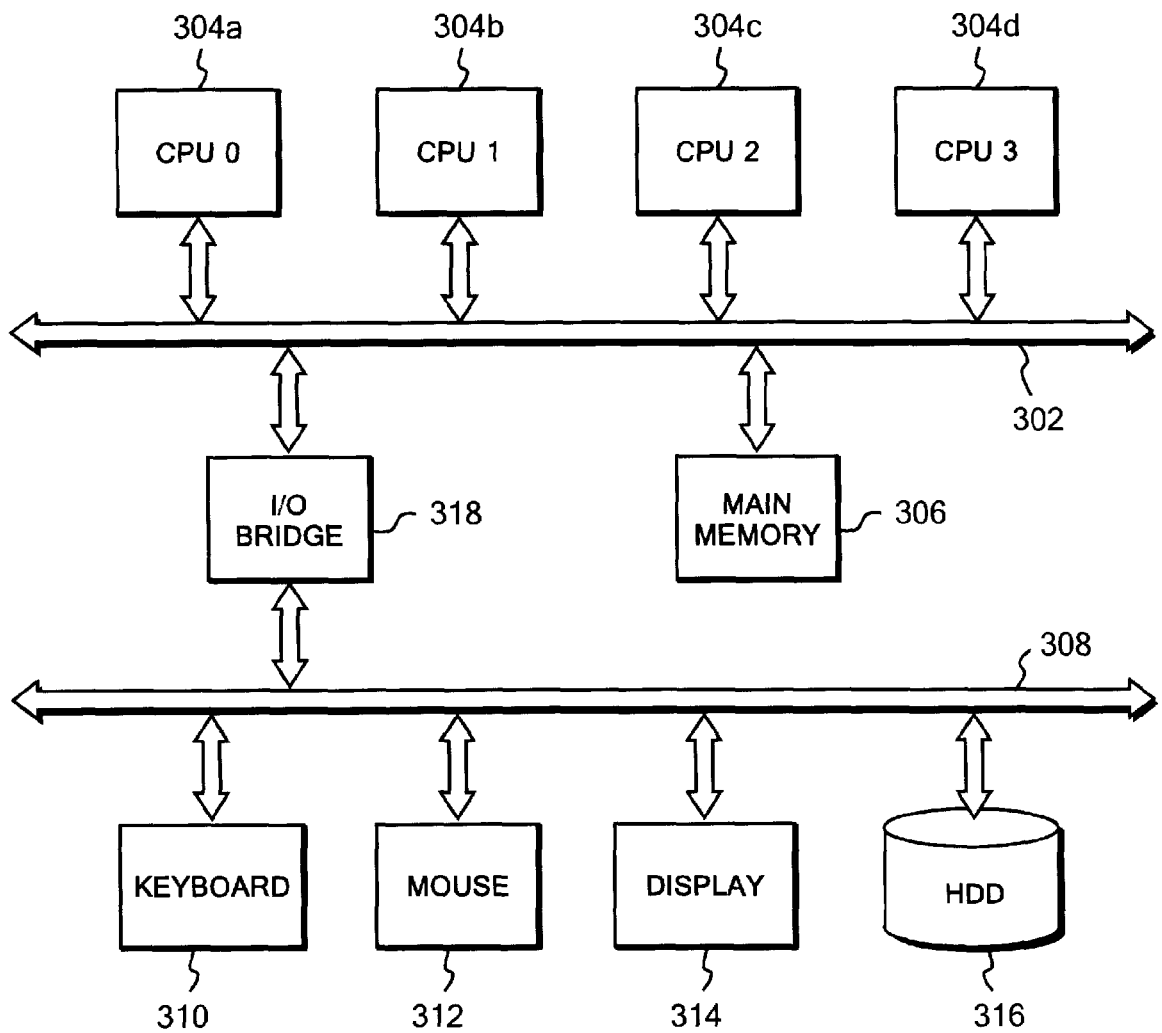
FIG. 3 shows a hardware block diagram of a computer used for carrying out the present invention.

FIG. 3 shows hardware of a computer used for carrying out the present invention. In FIG. 3, multiple CPUs, including CPU0 304a, CPU1 304b, CPU2 304c and CPU3 304d, are connected to a host bus 302. A main memory 306 for computing processing of CPU0 304a, CPU1 304b, CPU2 304c and CPU3 304d is further connected to the host bus 302.

A keyboard 310, a mouse 312, a display 314 and a hard disk drive 316 are connected to an I/O bus 308. The I/O bus 308 is connected to the host bus 302 through an I/O bridge 318. The keyboard 310 and the mouse 312 are used by an operator to make an operation such as entering a command or clicking on a menu. The display 314 is used for displaying a screen image for operating with a GUI a program according to the present invention.

Any computer system can be used as long as the computer system can run an ECU emulator program and a physical unit simulator program. The operating system is also not limited but rather any operating system can be used.

The hard disk drive 316 stores multiple ECU emulator programs and multiple physical unit simulator programs for testing and the program according to the present invention for testing by coordinating the plurality of ECU emulator programs and physical unit simulator programs. Those programs can be run by use of the keyboard 310 and the mouse 312.

In order to realize full-vehicle SILS, all ECU emulator programs and physical unit simulator programs used in one automobile are preferably stored in the hard disk drive 316.

The hard disk drive 316 also stores a global scheduler, a local scheduler for the ECU emulator program, and a scenario generator program storing various test scenarios, such as, an uphill, an expressway, and a winding road.

The terms "emulator" and "simulator" are defined as follows:

an "emulator" refers to a program for operating ECU code using CPU0 to CPU3 and the like as targets when the ECU code was originally written by assuming that the code is operated by another processor; and a "simulator" is a system for virtually calculating an operation of a physical system such as the engine.

Figure 4:
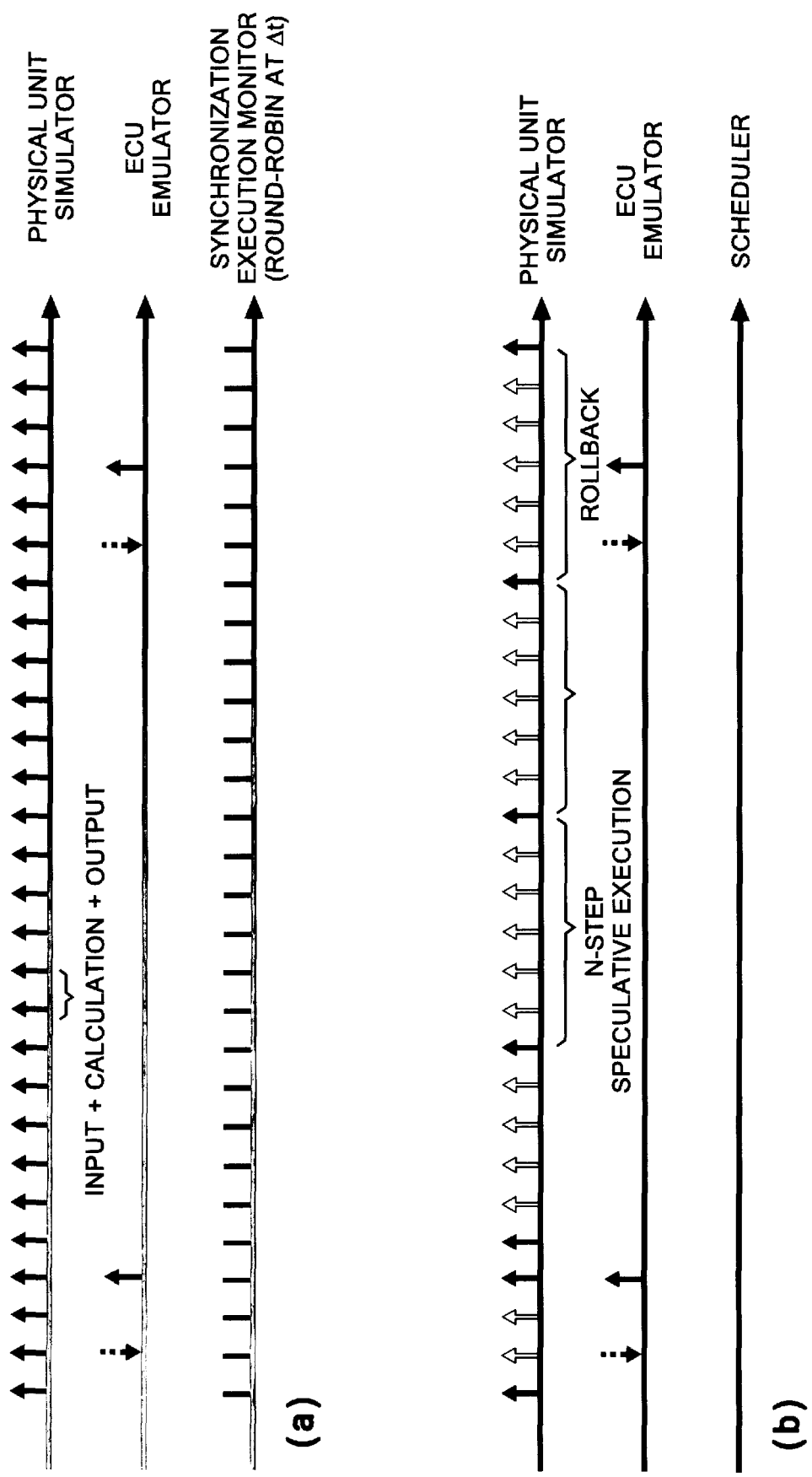
FIG. 4 shows a clock time chart showing comparison of operations between a conventional simulation system and a simulation system of the present invention.

FIG. 4 is a schematic clock time chart for explaining operation principles of the simulator system according to the present invention. First, for comparison, FIG. 4(a) shows an operation clock of a conventional simulator system. Such a conventional simulator system is driven by a synchronization execution monitor operated with a predetermined clock at an interval of $\Delta t$. A "physical unit simulator" as shown in FIG. 4(a), such as an engine simulator, is basically driven at the interval of $\Delta t$ and checks if there is an output from the ECU emulator for each clock interval.

Still referring to FIG. 4, compared with a physical unit simulator executed by continuous clocks, the outputs from the ECU emulator are very sparse and asynchronous. Examples of signals from an ECU emulator include, in the case of an engine ECU emulator, a fuel injection control signal, an ignition timing control signal, a knock determination control signal and the like. For example, the fuel injection control signal is provided only to a limited phase in one cycle of the engine making the signal far sparser than a drive clock of the engine simulator.

The present invention makes use of the properties described above. FIG. 4(b) shows a timing chart of the present invention. Specifically, as shown in FIG. 4(b), the physical unit simulator is not operated in synchronization with each of the entire clocks but is driven for N steps all at once. Thus, a calculation operation by the physical unit simulator can be speeded up. In FIG. 4(b), outline arrows indicate that modules of the simulator are not actually called up at timing of those clocks.

However, in the case where the physical unit simulator is driven for N steps all at once, an inconsistency between the output and value used in N-step continuous calculation can occur if there is an output from the ECU emulator during the driving. Therefore, according to the present invention, inputs and outputs are sequentially recorded in a rollback table for every driving of N steps. Accordingly, if there is a related parameter coming in from the ECU emulator as an output when the N-step continuous calculation is completed, the parameter is compared with a corresponding input in the rollback table. Thereafter, if the parameter and the input coincide with each other, speculative execution of the N-step continuous calculation is considered to be successful and then the processing moves to next N-step continuous calculation.

If the output from the ECU emulator does not coincide with the corresponding input in the rollback table, the speculative execution of the N-step continuous calculation is considered to have failed. Thereafter, the simulation system sets the physical unit simulator back to a point before a time indicated by the output from the ECU emulator and then starts step driving from that point. Accordingly, upon arrival at the time indicated by the output from the ECU emulator, the speculative execution of the N-step continuous calculation is restarted and recording in the rollback table is continued.

Figure 5:
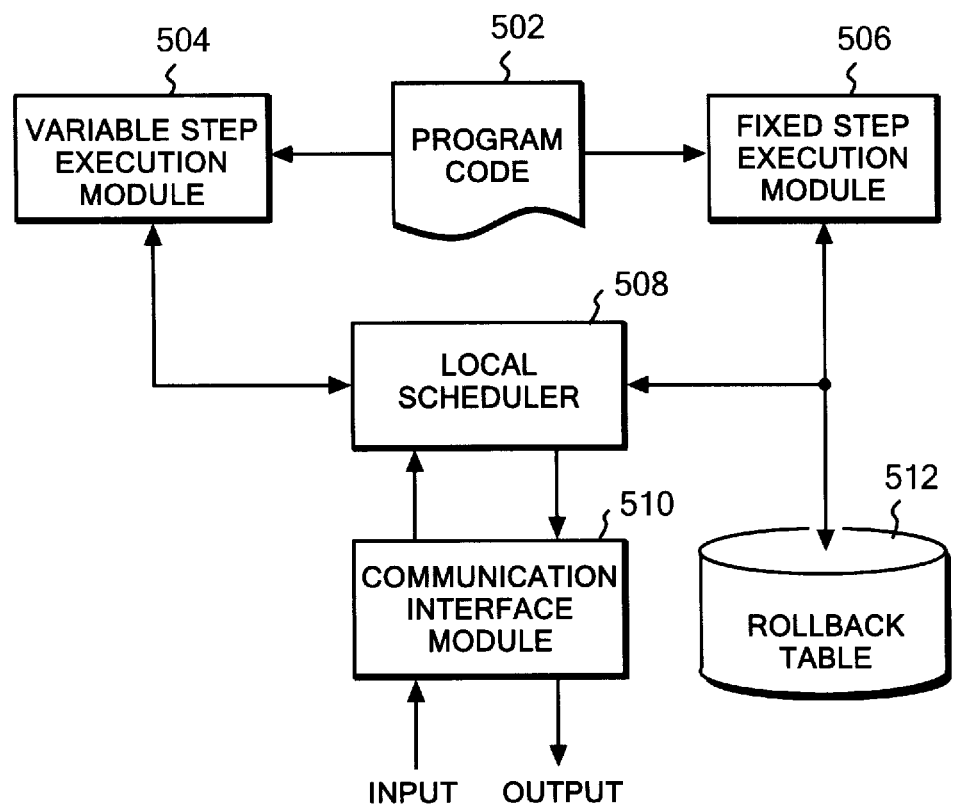
FIG. 5 shows a logic configuration block diagram of a physical unit simulator according to an embodiment of the present invention.

FIG. 5 is a functional block diagram of a logic configuration of the physical unit simulator according to the present invention. In FIG. 5, a program code 502 is a source code of the physical unit simulator, such as the engine simulator. If only an executable binary file of the physical unit simulator can be obtained, the source code is prepared by disassembling, decompiling or the like.

According to the present invention, a variable step execution module 504 and a fixed step execution module 506 are previously generated from the program code 502 of the physical unit simulator. Specifically, those modules are preferably automatically generated by program processing.

Now, for simplicity, the program code 502 is assumed to have the following contents.

```
Function Integer_X(Sum, X)
{
    Sum = Sum + X;
    Return(Sum);
}
```

From the program code 502, the following code is generated as the variable step execution module 504.

```
Function Integer_X_N(Sum, X, N)
{
    DO i= 1, N
        Sum = Sum + X;
    END
        Return(Sum);
}
```

From the program code 502, the following code is generated as the fixed step execution module 506.

```
Function Integer_100_speculative(Sum, X)
{
    DO i = 1, 100
        Sum = Sum + X;
    END
        Return(Sum);
}
```

To sum up, in such a case as FIG. 4(a), the following function is called up for each clock interval and thus overhead is caused each time, such as input variable setting, function call and returning outputs.

```
Function Integer_X(Sum, X)
{
    Sum = Sum + X;
    Return(Sum);
}
```

By replacing this with the following, the same effect as calling the above function 100 times can be realized and thus overhead for individual function calls can be reduced. Note that the present invention provides rollback means in case of speculation failure.

```
Function Integer_100_speculative(Sum, X)
{
    DO i = 1, 100
        Sum = Sum + X;
    END
        Return(Sum);
}
```

Here, the number '100' is illustrative of the number of steps of the fixed step execution module 506. Therefore, depending on a time interval of an actual number of clocks, an arbitrary and appropriate number, such as 500 or 1000, can be selected.

Note that, if the following code is present:

```
Function Integer_100_speculative(Sum, X)
{
    DO i = 1, 100
        Sum = Sum + X;
    END
        Return(Sum);
}
``` the code may be converted into an executable code as the following code by an optimization function of a compiler. Thus, the processing is further sped up.

```
Function Integer_100_speculative(Sum, X)
{
    Sum = Sum + 100 * X;
    Return(Sum);
}
```

A local scheduler 508 performs the following processing: the local scheduler compares an output from the ECU emulator, which is inputted through a communication interface module 510, with a corresponding entry recorded in a rollback table 512. Thereafter, if it is determined that speculative execution has been successful, the local scheduler executes the fixed step execution module 506. On the other hand, if it is determined that the speculative execution has failed, the local scheduler executes the variable step execution module 504. This processing will be described in detail later.

Figure 6:
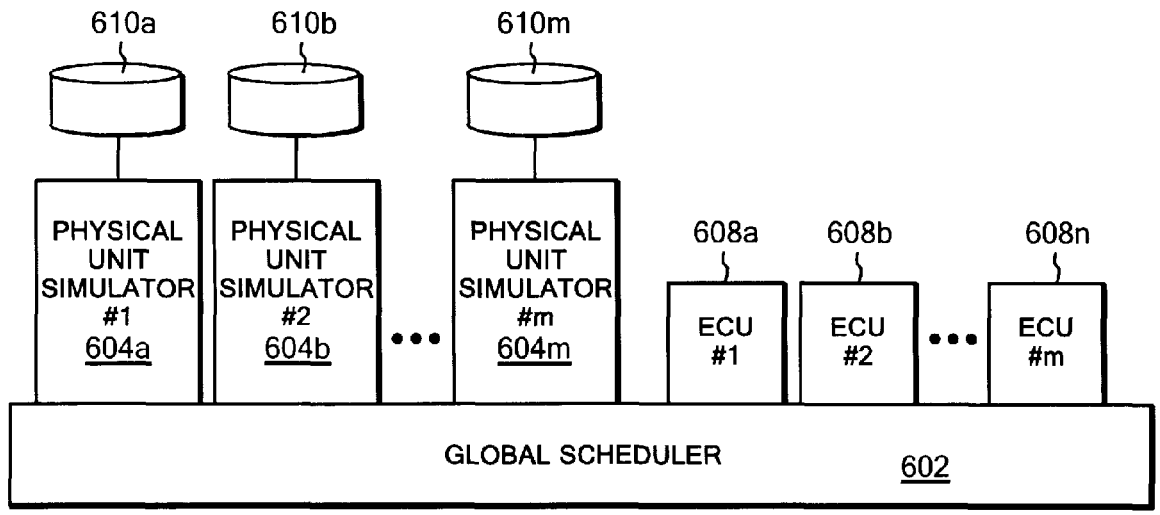
FIG. 6 shows a functional block diagram of an entire simulation system according to the embodiment of the present invention.

FIG. 6 is a functional logic block diagram of an entire simulation system according to the present invention. As shown in FIG. 6, the simulation system includes: physical unit simulators 604a, 604b . . . 604m; storage parts 610a, 610b . . . 610m for storing rollback tables thereof; ECU emulators 608a, 608b, . . . 608n; and a global scheduler 602 for scheduling the physical unit simulators 604a, 604b . . . 604m and inputs/outputs of the physical unit simulators 604a, 604b . . . 604m.

The physical unit simulators 604a, 604b . . . 604m, the ECU emulators 608a, 608b, . . . 608n and the global scheduler 602 are stored as executable modules in the hard disk drive 316, and are loaded into the main memory 306 and operated by processing executed by the operating system when the computer system shown in FIG. 3 is started.

The physical unit simulators 604a, 604b . . . 604m correspond to an engine, a brake, a drive train, an air conditioner and the like, respectively.

The global scheduler 602 receives outputs from the physical unit simulators 604a, 604b . . . 604m and the ECUs 608a, 608b, . . . 608n, temporarily buffers those outputs and transmits the outputs to the specified ECU emulators 608a, 608b, . . . 608n or physical unit simulators 604a, 604b . . . 604m based on a determinate time.

The global scheduler 602 is connected to the physical unit simulators 604a, 604b . . . 604m and the ECUs 608a, 608b, . . . 608n through, although not shown, a shared memory or a controller area network (CAN) simulator. In the case of a method using the shared memory, the output is written in an address of a specific memory and then signaled. Meanwhile, in the case of a method using the CAN simulator, a header including a predetermined address is attached to a message to be sent.

Although not shown, a scenario generator storing various test scenarios, such as an uphill, an expressway and a winding road, is also included in the configuration shown in FIG. 6. According to the scenarios stored in the scenario generator, inputs are given to the ECU emulators 608a, 608b, . . . 608n and simulations are performed under various conditions.

Figure 7:
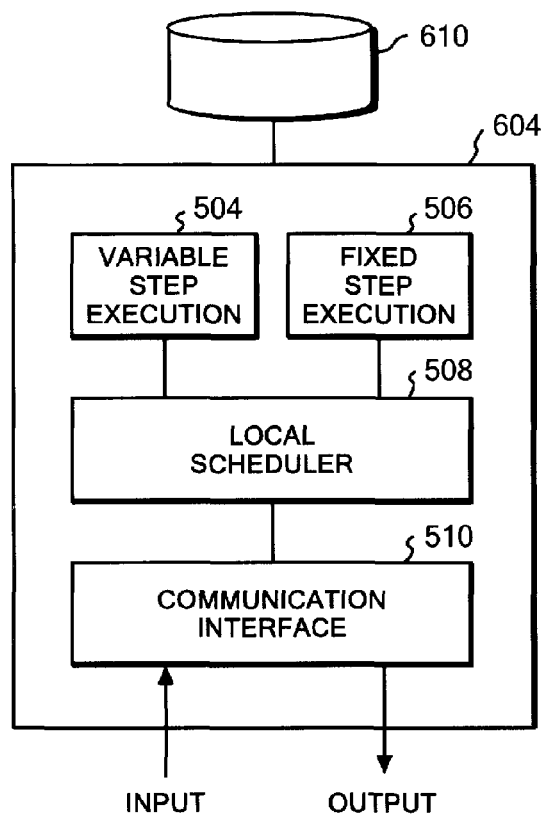
FIG. 7 shows a functional block diagram of the physical unit simulator according to the embodiment of the present invention.

As generally shown in FIG. 7, each of the physical unit simulators 604 preferably has the variable step execution module 504, the fixed step execution module 506, the local scheduler 508 and the communication interface 510. These functions are as described in connection with FIG. 5. The storage part 610 stores entries in the rollback table 512. Moreover, although not shown in FIG. 7, each of the physical unit simulators 604 has one queue.

The ECU emulator may also maintain a rollback table therein to perform speculative execution. This processing is described later on herein and also in U.S. patent application Ser. No. 12/436,870, filed May 7, 2009, the entire contents of which are incorporated herein by reference.

Figure 8:
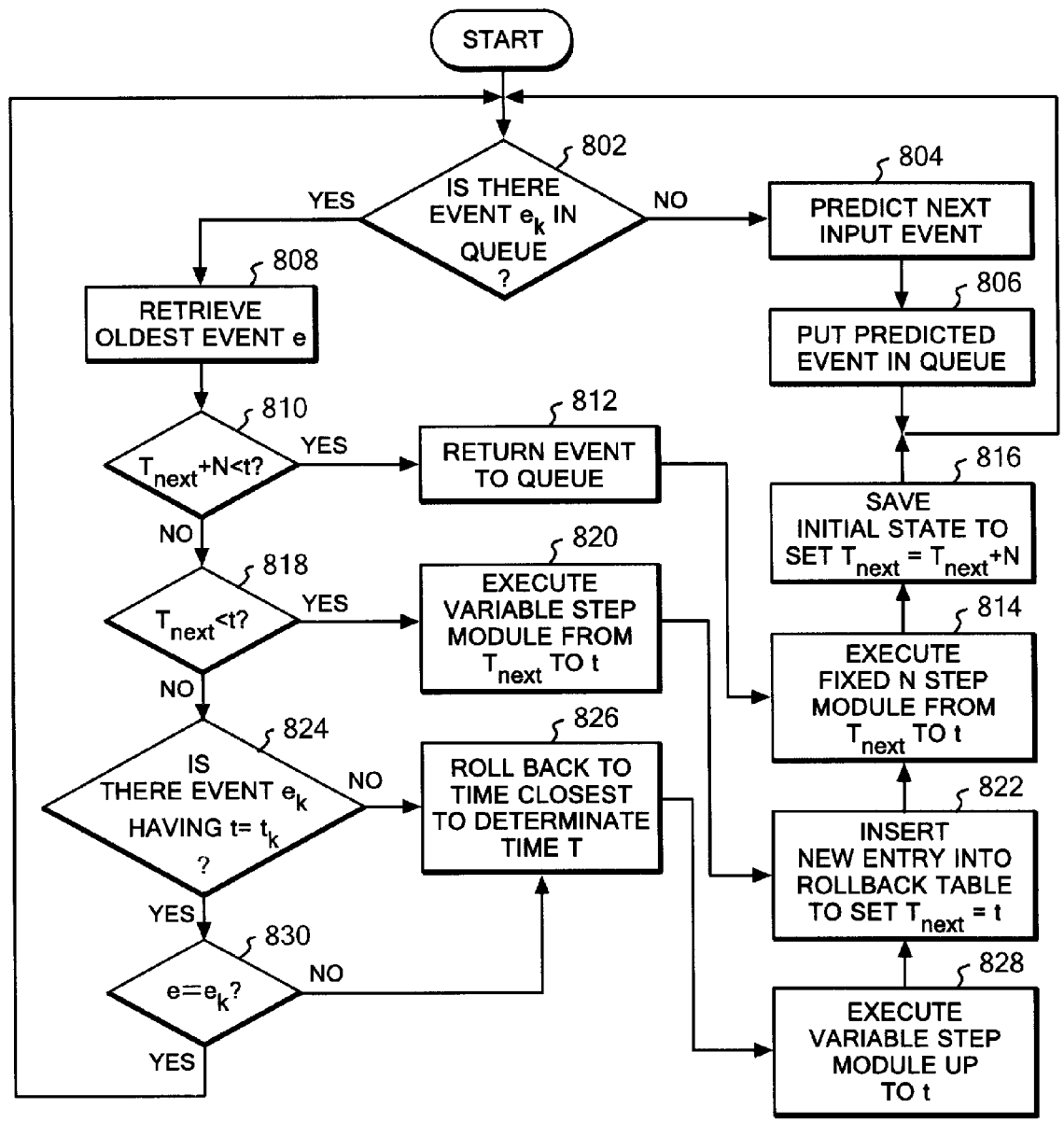
FIG. 8 shows a flowchart of processing executed by a local scheduler in the physical unit simulator.

Next, with reference to a flowchart of FIG. 8, description will be given of processing executed by the local scheduler 508 in the physical unit simulator 604. First, in Step 802, it is determined whether or not there is an event in a queue of the physical unit simulator 604. If there is no event in the queue, a new input event is predicted in Step 804. The prediction here is, for example, a prediction of an input event based on the previous input event. For example, a method using the same input event as the previous one. Alternatively, as for timing, a method for predicting an event so as to maintain the previous cycle can also be adopted. Here, the local scheduler 508 is previously programmed so as to perform best prediction based on properties, such as, whether the physical unit simulator is an engine simulator or a drive train simulator. The input event thus predicted is put in the queue in Step 806. Thereafter, the processing returns to Step 802.

If it is determined in Step 802 that there is an event in the queue, in other words, the queue is not empty, the oldest event is retrieved from the queue in Step 808. Assuming that a timestamp of the oldest event is t, it is determined in Step 810 whether or not $T_{next}+N<t$ is established. Here, $T_{next}$ is a next execution time and N is one execution time for the fixed step execution module 506.

If $T_{next}+N<t$, the event is returned to the queue once in Step 812 and the fixed step execution module 506 is called up to continuously execute N steps from the time $T_{next}$ in Step 814. Thereafter, in Step 816, an internal state after the execution is stored and the time $T_{next}$ is incremented by N. Subsequently, the processing returns to Step 802.

If it is determined in Step 810 that $T_{next}+N<t$ is not established, it is determined in Step 818 whether or not $T_{next}<t$ is established. If $T_{next}<t$ is established, the variable step execution module is executed from $T_{next}$ to t in Step 820. Thereafter, in Step 822, a new entry as a result of the execution is inserted into the rollback table to set $T_{next}=t$. Subsequently, the fixed step execution module 506 is called up to continuously execute N steps. Thereafter, in Step 816, an internal state after the execution is stored and the time $T_{next}$ is incremented by N. Subsequently, the processing returns to Step 802.

If it is determined in Step 818 that $T_{next}<t$ is not established, it is determined in Step 824 whether or not there is an event having $t_k$ which satisfies $t=t_k$ in the rollback table. If there is no event having $t_k$ which satisfies $t=t_k$, the time is rolled back to a time closest to a determinate time T in Step 826. Specifically, all the entries are deleted except for the entry closest to the determinate time T. Next, in Step 828, the variable step execution module is executed up to t. Thereafter, in Step 822, a new entry as a result of the execution is inserted into the rollback table to set $T_{next}=t$. Next, in Step 814, the fixed step execution module 506 is called up to continuously execute N steps from the time $T_{next}$. Thereafter, in Step 816, an internal state after the execution is stored and the time $T_{next}$ is incremented by N. Subsequently, the processing returns to Step 802.

If it is determined in Step 824 that there is the event having $t_k$ which satisfies $t=t_k$, then in Step 830 an event e retrieved from the queue is compared with an event $e_k$ in the rollback table, wherein the event $e_k$ has the time $t_k$. If $e=e_k$, this means that the speculative execution has been successful. Thereafter, the processing returns to Step 802.

If $e=e_k$ is not established, the processing goes to Step 826 where the time is rolled back to a time closest to the determinate time T. Specifically, all the entries are deleted except for the entry closest to the determinate time T. Next, in Step 828, the variable step execution module is executed up to t. Thereafter, in Step 822, a new entry as a result of the execution is inserted into the rollback table to set $T_{next}=t$. Next, in Step 814, the fixed step execution module 506 is called up to continuously execute N steps from the time $T_{next}$. Thereafter, in Step 816, an internal state after the execution is stored and the time $T_{next}$ is incremented by N. Subsequently, the processing returns to Step 802.

Note that comparison of the events means checking if parameters included therein coincide with each other. The parameters include, for example, a fuel injection amount, a temperature and the like. In determination of consistency as values, significant digits (the number of digits) are changed according to properties of an amount thereof. For example, in the case of the injection amount or the temperature, consistency may be determined with upper two digits. Depending on such a degree of tolerance to an error, many speculative executions can be determined to be successful. This is an important point in enabling speculative simulation.

Note that a determinate flag in the rollback table is notified separately from the global scheduler and is updated every time. The local scheduler makes no determination. Moreover, determinate entries are never cancelled and thus all the previous entries, except for the last determinate entry, may be deleted from the rollback table.

Figures 9, 10:
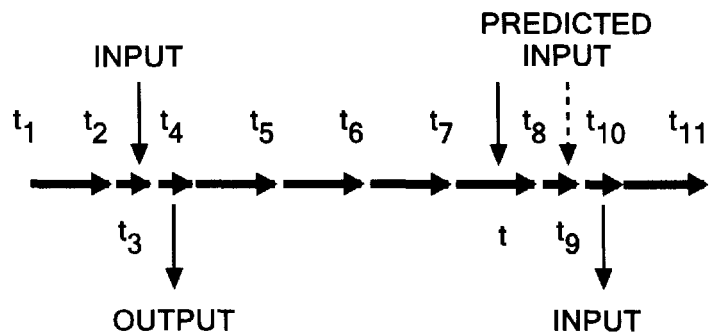
FIG. 9 shows a timing chart of the physical unit simulator.
FIG. 10 shows entries in a rollback table in the physical unit simulator.

FIG. 9 is a timing chart showing examples of an input to the physical unit simulator, an output and a predicted input.

FIG. 10 shows entries in the rollback table corresponding to FIG. 9. As shown in FIG. 10, entries after the time t in the rollback table can be cancelled as yet to be determined.

Figure 11:
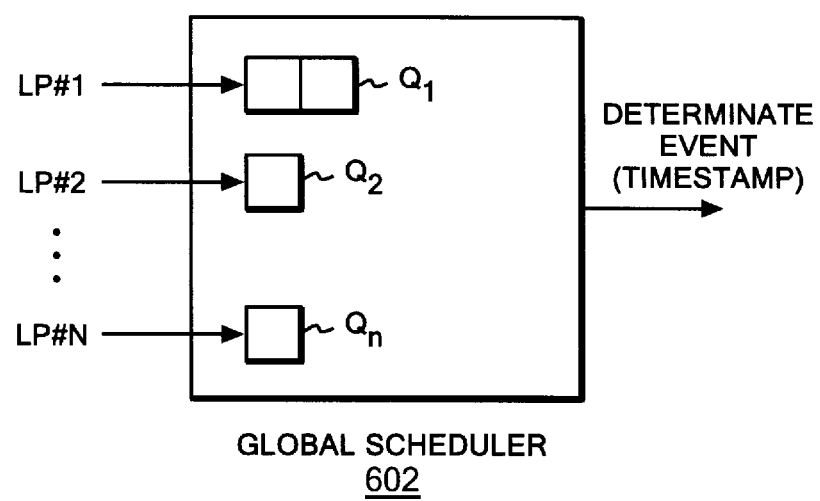
FIG. 11 shows queues in a global scheduler.

As shown in FIG. 11, the global scheduler 602 has queues Q1 to Qn for logical processes LP#1 to LP#N, respectively. Each of the logical processes is any one of the physical unit simulators #1 to #m and the ECU emulators #1 to #n shown in FIG. 6.

Events come, as needed, into the queues Q1 to Qn from the logical processes LP#1 to LP#N corresponding thereto and the events are temporarily stored in the queues. The global scheduler 602 outputs a determinate event and a determinate time based on the events stored in the queues Q1 to Qn.

Figure 12:
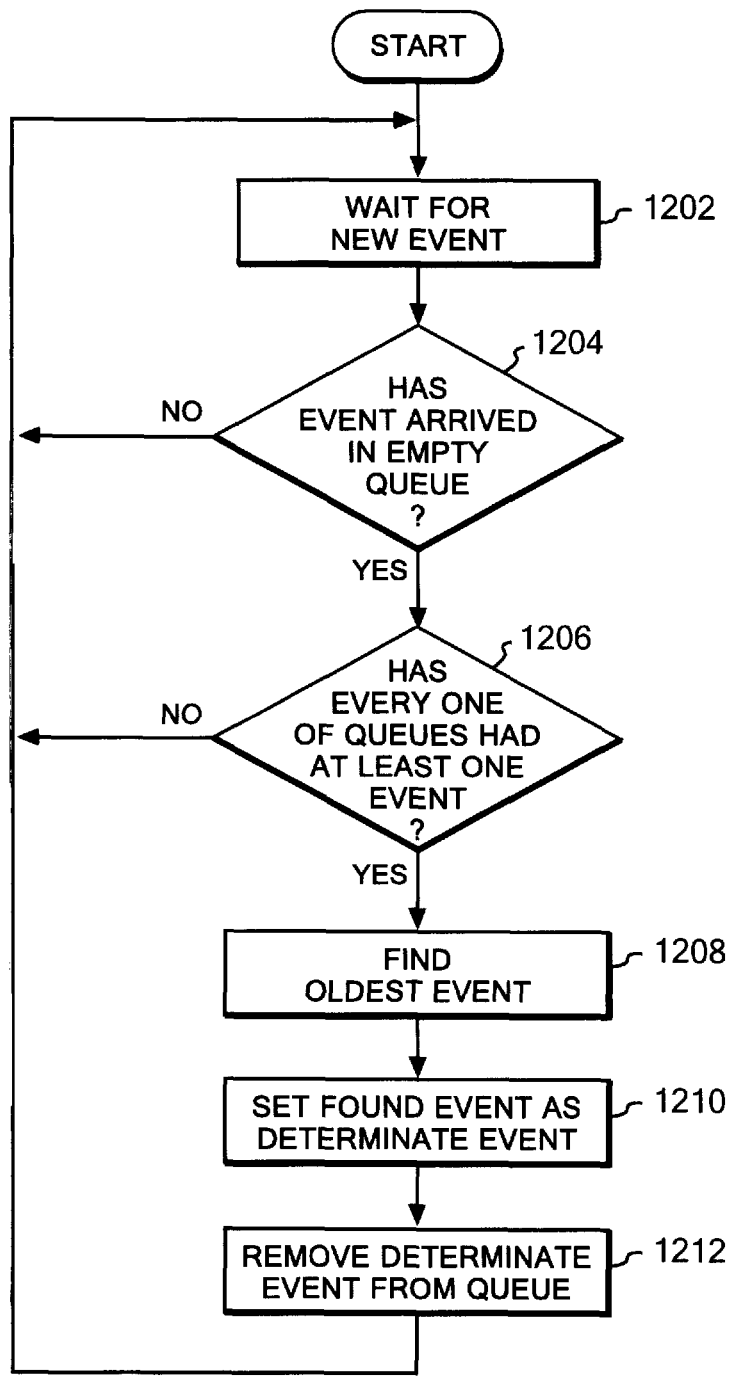
FIG. 12 shows a flowchart of processing executed by the global scheduler.

FIG. 12 shows a flowchart of processing executed by the global scheduler 602. In Step 1202, the global scheduler 602 waits for a new event to come into any one of the queues Q1 to Qn as shown in FIG. 11.

In Step 1204, it is determined whether or not an event has arrived in an empty queue. If no event has arrived therein, the processing returns to Step 1202.

If it is determined in Step 1204 that the event has arrived in the empty queue, the processing advances to Step 1206 where it is determined whether or not every one of the queues Q1 to Qn has at least one event. If not so, the processing again returns to Step 1202.

If it is determined in Step 1206 that every one of the queues Q1 to Qn has at least one event, the oldest event among all the queues Q1 to Qn is determined in Step 1208. This is possible because timestamps are attached to all the events.

In Step 1210, the oldest event found is set as a determinate event and then notified to the logical processes LP#1 to LP#N.

In Step 1212, the determinate event is removed from the queue. Thereafter, the processing returns to Step 1202 where the global scheduler 602 waits for arrival of a next event.

Figure 13:
FIG. 13 shows a temporal transition of a clock response of an ECU software emulator.

FIG. 13 illustrates the operation of a physical unit or controlled object.

If the controlled object is a mechanism system to be solved by the Newtonian mechanics equation, then a control output of the ECU at a certain point has internal state variables such as a position and a speed of a movable portion of the mechanism system. Thus, the output is not determined only by an input at the point.

The same is true if the controlled object is an electrical circuit. There are internal state variables such as an amount of charges left in a capacitor in the electrical circuit and magnetic force caused by inductance of a coil.

Therefore, for an input u, the ECU outputs a value y obtained by taking into consideration an internal state x thereof, as shown in FIG. 13.

In the present invention, the internal state of the software emulator of the ECU is retrieved and utilized. Depending on the software emulator, there are cases where the internal state can be retrieved and where the internal state cannot be retrieved. Therefore, in the case where the internal state of the software emulator of the ECU cannot be retrieved, the following processing is performed by use of a source code analysis tool.

If a source code of the software emulator of the ECU is available then source code is used. However, if there is only an executable binary file, then the file is disassembled or decompiled by use of a predetermined tool.

For the source code of the software emulator of the ECU, a data flow analysis technique is applied to divide the source code into basic blocks. The basic blocks mean divided portions of the source code that are obtained by dividing the source code at a spot where multiple controls converge or where the control is branched into multiple controls. Such basic blocks are used as nodes and those nodes are connected to each other so as to be linked with flows of the branched controls. Thus, a directed graph structure is formed. This structure is also particularly called a control flow graph. The control flow graph has a start point node and an end point node, and all nodes that can be executed by the program have effective edges from the start point node. Among the basic blocks, all terminal nodes of control including statements such as exit and return have effective edges to the end point node.

Next, Use/Def analysis is performed for all possible paths from the start point node to the end point node in the control flow graph. Here, 'Use' means the case where a certain variable is used for storing a value in another variable. Typically, 'Use' is a right-hand side of an assignment expression. Meanwhile, 'Def' means the case where a value is stored in a certain variable. Typically, 'Def' is a left-hand side of the assignment expression.

In this case, each of the paths is checked as to whether or not there is a variable subjected to Use before Def or without Def, in other words, whether or not there is an undefined reference variable. If there is the undefined reference variable, a name of the variable is once saved.

After all the paths are thus scanned, a wrapper code is generated as will be described later by use of the stored variable name.

Meanwhile, execution flow scanning and the Use/Def analysis can be executed more efficiently by use of the data flow analysis technique. Thus, description will be given below of the technique.

A first step of the data flow analysis is to calculate a def list in each of the basic blocks. Specifically, a list of variables used in the entire program is expressed by 1 bit. Specifically a variable is expressed by a bit vector so as to set variables defined for each basic block to 1 and to set those not defined for each basic block to 0.

A second step thereof is to calculate an attainable def list in the entire program. Specifically, in each basic block, if there are multiple inputs, the inputs are taken a logical multiplication (AND) to be set as an input to itself. An output from itself takes a logical sum (OR) of the input and the def list defined by itself and is handed over to a subsequent basic block. As an execution order, a depth-priority order on the control flow graph is efficient.

A third step is to obtain a closure of the attainable def list by use of a closure analysis algorithm. Thereafter, the second step described above is repeated until output def lists of all the basic blocks are no longer changed. Here, the closure means a value linked with an environment.

A fourth step is to find use of undefined variables. Specifically, variables to be used as "use" are detected, the variables being expressed as 0 in an input def list of each basic block.

Note that further details about the data flow analysis described above can be found in Alfred V. Aho, Ravi Sethi, Jeffrey D. Ullman, "Compilers Principles, Technologies, and Tools", Addison-Wesley Publishing Company, 1986, p. 608-633.

Now, for example, it is assumed that an original ECU simulation source code is expressed by a function Func(x, y, z) and that 'a' and 'b' are registered as undefined reference variables.

Then, for example, a function _Func(x, y, z, _a, _b) is prepared.

```
_Func(x, y, z, _a, _b)
{
  a = _a;
  b = _b;
  Func(x, y, z);
  _a = a;
  _b = b;
  return;
}
```

The first portion of the function above, wherein 'a=_a' and 'b=_b', is an example of an input wrapper code.

The last portion of the function above, wherein '_a=a' and '_b=b' and then return, is called an output wrapper code.

Note that the portion Func(x, y, z) does not have to be a function call but may be in-line expansion. By calling such a function _Func(x, y, z, _a, _b) with appropriate values assigned to _a and _b, an internal state of Func(x, y, z) can be set. As a result of calling _Func(x, y, z, _a, _b), values of the internal state after processing are set in _a and _b. Thus, according to need, those values can be used by separately storing the values, or the like. The source codes with the wrapper codes attached thereto, as described above, are compiled or assembled to generate an executable program.

Moreover, depending on specifications of a specific processing language, such as C++, it may be required to give reference operators & as arguments in the function so as to obtain a function such as _Func(x, y, z, &_a, &_b), not _Func(x, y, z, _a, _b).

Figure 14:
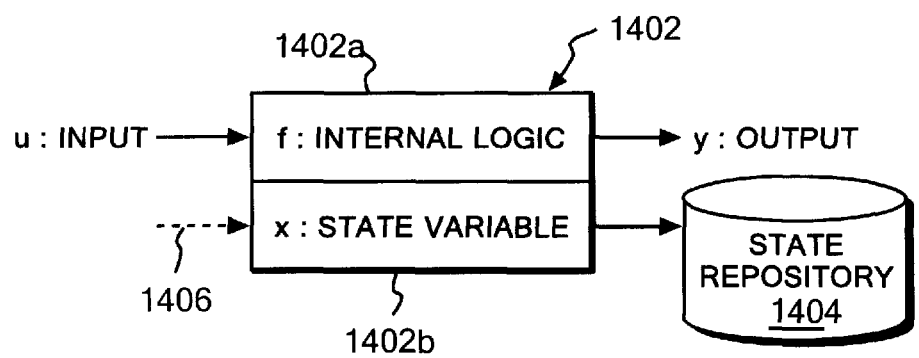
FIG. 14 shows a block diagram of the software emulator of the ECU after retrieval of an internal variable has been enabled.

FIG. 14 schematically shows the software emulator of the ECU after retrieval of the internal state or internal variable has been enabled. As shown in FIG. 14, the software emulator 1402 of the ECU is favorably divided into a portion indicating an internal logic f and an internal state or a state variable x.

Accordingly, output y=f(t, x, u, . . . ) can be described by use of the internal logic f. Here, t is time. Moreover, by separating a code related to the state variable x, the state variable x and, preferably, the input u can be written into a hard disk drive as a state repository 1404 at an arbitrary point, in other words, typically at a timing of the output.

In addition to the above, the separation of the code related to the state variable x also achieves the following effect. Specifically, as indicated by an arrow 1406, the state variable x can be set at an arbitrary point in the software emulator 1402. Thus, by selecting the input and the state variable x from the state repository 1404 and setting the selected input and variable, the software emulator 1402 of the ECU can be set back to a state at an arbitrary point where the state variable x is written into the state repository 1404 and can be allowed to redo the calculation.

If the ECU emulator program cannot retrieve an internal state variable as it is, then the state variable is previously set to be retrievable by providing the wrapper code described above.

As an example, a code for assigning the ECU emulator programs to multiple CPUs by creating threads will be described by taking C language as an example.

```
void* ecu_wrapper(void* parm)
{
    ...
    /* define state_repository */
    ...
    LOOP_BEGIN:
        ...
        /* perform unit processing of ECU */
    LOOP_END:
        ...
}
```

When the following is set after preparation of the above code,
pthread_t thread_id;
pthread_attr_t thread_attr;
pthread_attr_init(&thread_attr);
pthread_create(&thread_id, thread_attr, ecu_wrapper, NULL);
pthread_attr_destroy(&thread_attr);
the operating system generates a thread and assigns the thread to the ECU emulator program. Although the thread is physically assigned to either the CPU0 or the CPU1, the assignment is left to the operating system and is transparent to the emulator program.

Such assignment processing is individually performed for each of the ECU emulator programs 608*a*, 608*b*, . . . 608*n*.

Figure 15:
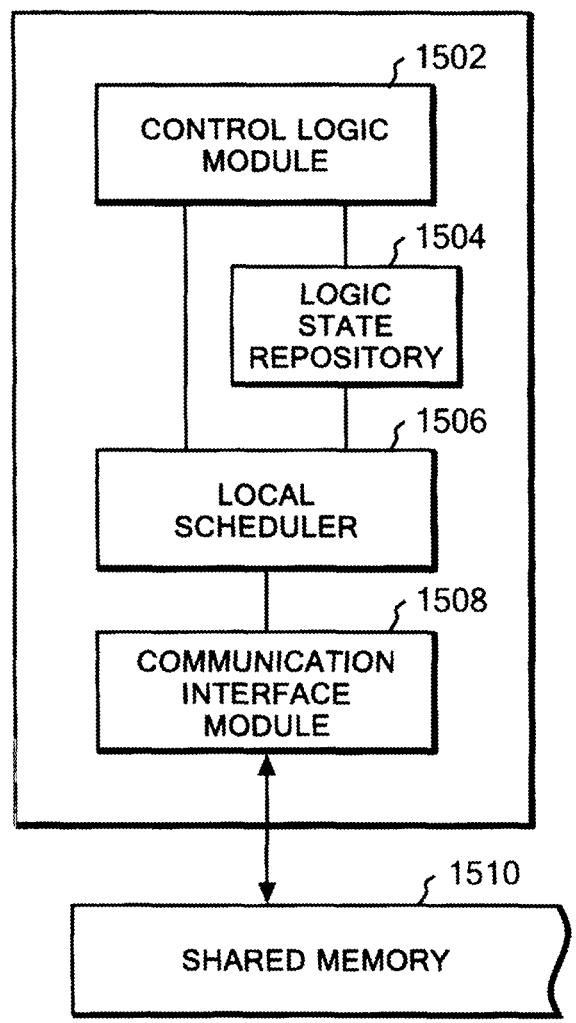
FIG. 15 shows a more detailed logic block diagram of an inside of an ECU emulator program.

FIG. 15 shows a more detailed logic block diagram of an inside of the ECU emulator program 608. Here, the ECU emulator programs 608*a*, 608*b*, . . . 608*m* will be collectively referred to as the ECU emulator program 608.

A control logic module 1502 is a main body including a so-called original logic of the ECU emulator.

A logic state repository 1504 has a function of sequentially storing internal state variables retrieved from the control logic module 1502 by use of the method for adding the wrapper code described above.

A local scheduler 1506 has a function of setting the ECU emulator program 608 back to a desired state by writing the internal state variables stored in the logic state repository 1504 back into the control logic module 1502. The logic state repository 1504 and the local scheduler 1506 can be included in the wrapper code described above, which is added to the ECU emulator.

Note that event inputs are provided to the control logic module 1502 from the shared memory 1510 through a communication interface module 1508.

Although not shown, the ECU emulator 608 shown in FIG. 15 has a queue for temporarily storing the inputted events. The queue may be provided in the control logic module 1502 or may be provided in a dedicated private memory region in the main memory 306.

For example, an output from an air conditioner ECU is inputted to an engine ECU. This is because it is required to change an engine speed according to a drive state of the air conditioner and thus to regulate an amount of power generation The communication interface module 1508 transmits an output from the control logic module 1502 to the shared memory 1510 or the controller area network (CAN) emulator (not shown).

Figure 16:
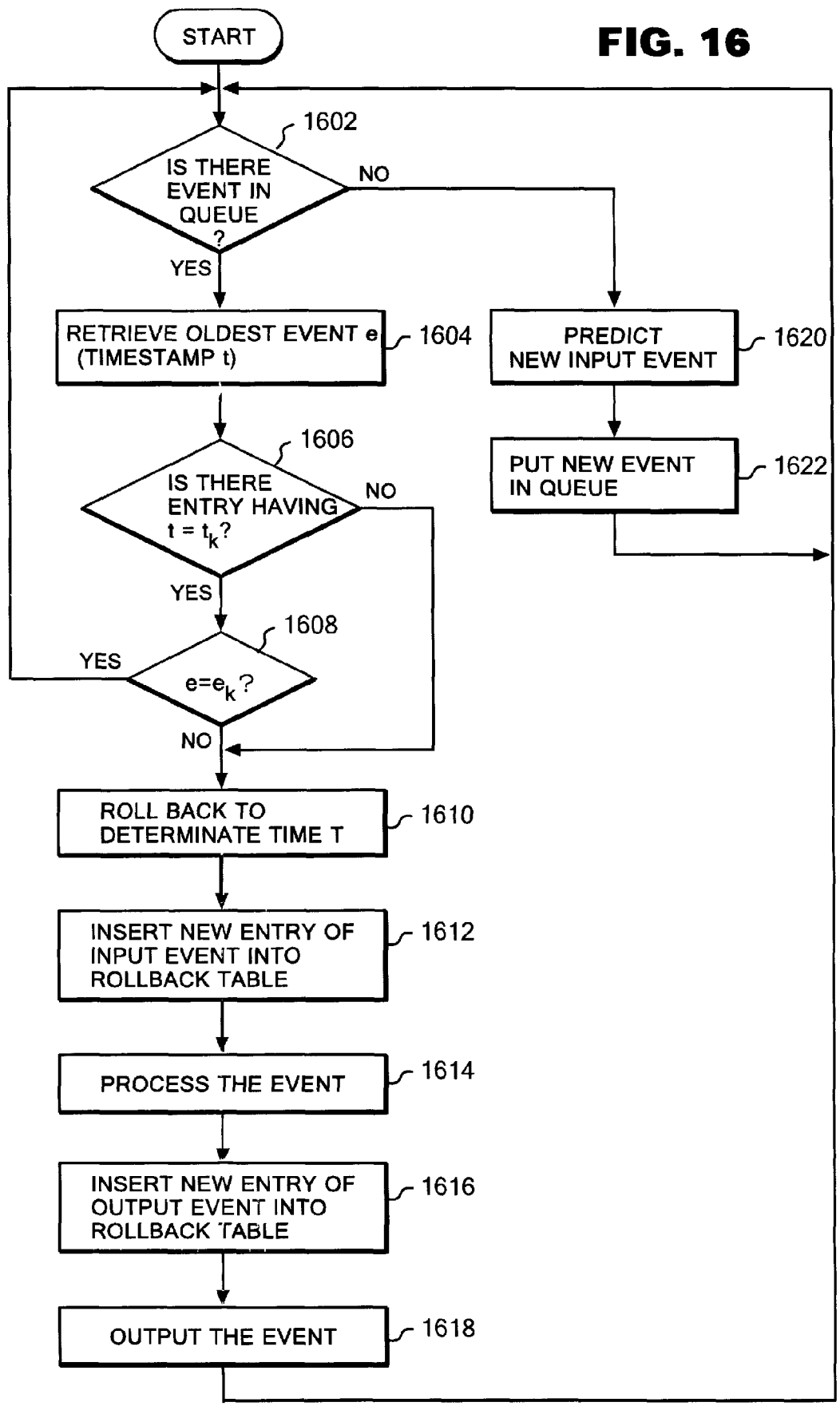
FIG. 16 shows a flowchart of processing executed by an ECU emulator.

FIG. 16 describes the processing executed by the ECU emulator. Most of the processing here is mainly performed by the local scheduler 1506. In Step 1602, it is determined whether or not an event has come in a queue from another logical process. If there are events in the queue, the oldest event e is retrieved in Step 1604. A timestamp of this event e is set as t.

In Step 1606, it is determined whether or not there is an entry having $t=t_k$ in a rollback table. The rollback table includes, as shown in FIG. 10, timestamps, input events, output events, internal states and determinate flags. Through processing to be described later, the rollback table is preferably written in a region of the main memory 306 assigned to the ECU emulator by the logic state repository module 1504. The rollback table may be written not in the main memory 306 but in the hard disk drive 316.

Meanwhile, as can be seen from FIG. 10, the rollback table has two kinds of entries. One is an input event entry, in which only a timestamp column and an input event column are active.

The other is an output event entry, including an output timestamp column, an output event, an internal state in that event and a determinate flag. Storing the internal state in the rollback table is advantageous for restarting calculation from the middle thereof. Note that, by use of the wrapper code technique described above, the logic of the emulator originally implicitly having the internal state can be changed to a logic having the internal state retrieved to the outside as a state variable.

When there is the entry having $t=t_k$ in the rollback table, the entry is set as $e_k$ and it is determined in Step 1608 whether or not $e=e_k$. If e and $e_k$ are floating-point numbers, the comparison may be made between rough numbers by rounding off the numbers to a certain digit. A positive result of the determination in Step 1608 means that the previous speculative execution has been successful. Thereafter, the processing returns to the first Step 1602.

If it is determined in Step 1606 that the entry having $t=t_k$ is not in the rollback table, the time is set back to a determinate time T in Step 1610 and the entries having times coming after the determinate time in the rollback table are deleted. The entries to be deleted are those below the dotted line in FIG. 10. Note that the determinate time T is notified by processing to be described later, which is executed by the global scheduler 602.

In Step 1612, a new entry is created from the time t and the event e and then is inserted into the rollback table.

In Step 1614, the control logic module 502 performs new event processing by use of an internal state of a determinate entry. The internal state here is one represented as a state variable.

In Step 1616, an output event generated as a result of the event processing is inserted into the rollback table. In Step 1618, the output event is transmitted to a predetermined physical unit simulator through the communication interface module 1508. The ways of transmission are different between two methods. Specifically, in the case of a method using the shared memory, the output event is written in an address of a specific memory and then signaled. Meanwhile, in the case of a method using the CAN emulator, a header including a predetermined address is attached to a message to be sent. Such processing is performed by the communication interface module 1508 shown in FIG. 15. Thereafter, the processing returns to Step 1602.

If it is determined in Step 1602 that there is no event in the queue, a new input event is predicted in Step 1620. For example, in the case of the ECU emulator for the engine simulator, events are predicted to approximately periodically come in. Thus, based on the prediction, the predicted new event is put in the queue in Step 1622. Thereafter, the processing returns to Step 1602.

Note that, when the processing based on the prediction is continuously carried on while no event arrives in the queue, indeterminate entries occupy the rollback table and a size of the table is sometimes significantly increased. In order to prevent such a situation, an upper limit is set for the number of the indeterminate entries in the rollback table and the number thereof is systematically controlled so as not to exceed the upper limit. Moreover, the determinate entries are discarded except for the last one, thereby preventing unnecessary entries from increasing the size of the rollback table.

The present invention has been described in connection with a simulation system/testing system including multiple physical unit emulators and ECU emulators for an automobile. However, those skilled in the art in the field to which the present invention pertains will understand that the present invention is not limited to such a specific embodiment but can be applied to a simulation system for any general electronic machine control system, for example, a simulation system for aircraft.

Although the preferred embodiment of the present invention has been described in detail, it should be understood that various changes, substitutions and alternations can be made therein without departing from spirit and scope of the inventions as defined by the appended claims.

What is claimed is:

1. A simulation method for simulating a physical unit controlled by an electronic control unit, the method comprising the steps of:
    operating a physical unit simulator through computer processing continuously for a fixed number of multiple steps in a speculative simulation;
    recording, upon completion of the physical unit simulator operating for the fixed number of multiple steps, a time of a speculative input event corresponding to an end of the fixed number of multiple steps, the speculative input event and an internal state variable in a rollback table in a readable manner through computer processing;
    receiving at the physical unit simulator an output event, including a time of the output event, from an electronic control unit emulator;
    determining, by a global scheduler, an oldest event recorded in the rollback table by either the physical unit simulator or the electronic control unit emulator;
    updating a determinate time to a time of the oldest event in the rollback table, wherein the oldest output event is marked as a determinate entry in the rollback table;
    notifying the electronic control unit emulator and the physical unit system simulator of the determinate time;
    setting the physical unit simulator back to the determinate time corresponding to a time of the determinate entry upon determining an inconsistency between the time of the output event from the electronic control unit emulator and the time of the speculative input event recorded in the rollback table;
    operating the physical unit simulator up to the time of the output event from the electronic control unit emulator.

2. The simulation method according to claim 1, wherein a local scheduler of the physical unit simulator performs an approximate comparison between the output event from the electronic control unit emulator and the speculative input event recorded in the rollback table using rounded numerical values of the time of the output event and the time of the speculative input event in determining whether a speculative execution using the speculative input was successful.

3. A simulation system for simulating a physical unit system controlled by a plurality of electronic control units, the simulation system comprising:
    a physical unit system simulator for simulating a plurality of physical units; and
    a plurality of electronic control unit emulators for electronically emulating a plurality of respective electronic control units, each unit configured for receiving an input event with a time and giving an output event with a time, the output event being inputted to the physical unit system simulator, wherein each electronic control unit emulator has (i) a data queue for storing the input event and (ii) means for sequentially recording the input event of the electronic control unit emulator, the time of the input event as a timestamp thereof, the output event and the time of the output event as a timestamp thereof as a rollback table;
    means for determining whether there is an input event in a queue of an electronic control unit emulator, generating a predicted input event if there is no input event in the queue, putting the generated predicted input event in the queue, retrieving the input event, determining whether or not there is an entry corresponding to a timestamp of the input event in the rollback table, tracking back to an entry regarded as a determinate entry in the rollback table if there is no entry, the step of tracking back including deleting entries having times coming after a determinate time if there is no entry corresponding to the timestamp of the input event in the rollback table and outputting an output event calculated by the electronic control unit emulator based on an input event of the entry regarded as the determinate entry; and
    a global scheduler for receiving and holding the output events from the plurality of electronic control unit emulators and output events from the physical unit system simulator, updating the determinate time in response to determining an output event with an oldest time, and notifying the electronic control unit emulators and the physical unit system simulator of an updated determinate time corresponding to a time of the output event with an oldest time among all of the output events, wherein the oldest output event is the entry regarded as the determinate entry.

4. The simulation system according to claim 3, wherein the event regarded as the determinate entry in the rollback table is determined according to notification of the determinate time by the global scheduler.

5. The simulation system according to claim 3, wherein the electronic control unit emulator, the physical unit system simulator and the global scheduler are connected through a shared memory.

6. The simulation system according to claim 3, wherein the electronic control unit emulator, the physical unit system simulator and the global scheduler are connected to each other through a controller area network (CAN) emulator.

7. A simulation method for simulating, by use of a computer, a physical unit system controlled by a plurality of electronic control units, the method comprising the steps of:
    simulating, by use of a computer, a fixed number of multiple steps of a physical unit system having a plurality of physical units;
    recording, upon completion of the fixed number of multiple steps of the physical unit system, indeterminate entries in a rollback table, the indeterminate entries including a time of a speculative input event corresponding to an end of the fixed number of multiple steps, the speculative input event and an internal state variable;
    emulating, by use of a computer, a plurality of electronic control units controlling the simulated physical unit system, each electronic control unit thereby receiving an input event with a timestamp, having a queue for storing the input event and giving an output event with a timestamp, wherein the output event is inputted to the simulated physical unit system;

sequentially recording the input events of an emulated electronic control unit-together with a timestamp of each input event and the output events together with a timestamp of each output event in the rollback table;

receiving, at a global scheduler, the output event from the plurality of electronic control unit emulator and the speculative input event from the physical unit system simulator, and marking a latest one of the output event from the plurality of electronic control unit emulator and the speculative input event from the physical unit system simulator as a determinate entry in the rollback table;

updating a determinate time to correspond to a time of the determinate entry;

notifying the emulated electronic control unit and the simulated physical unit of the determinate time;

generating a predicted input event upon determining that there is no input event in the emulated electronic control unit's queue;

putting the generated predicted input event in the queue;

retrieving the input event if in the queue;

tracking back to the latest entry in the rollback table marked as the determinate entry upon determining that there is no entry corresponding to a timestamp of the input event in the rollback table; and outputting an output event calculated by the emulated electronic control unit based on the input event of the latest consistent entry to the simulated physical unit.

8. The simulation method according to claim 7, wherein the method is iterative.

9. The simulation method according to claim 7, further comprising deleting the input events and the output events having times coming after the of the determinate entry.

10. A simulation method for simulating a physical unit controlled by an electronic control unit, the method comprising the steps of:

providing a physical unit simulator comprising a variable step execution module, a fixed step execution module, a local scheduler, a queue and a rollback table;

receiving at the physical unit simulator an output event, including a time of the output event, from an electronic control unit emulator;

inputting predicted events into the queue;

retrieving, by a global scheduler, an oldest event from the queue, wherein the oldest event has a timestamp t and setting the oldest event as a determinate event having a determinate time;

notifying the electronic control unit emulator and the physical unit system simulator of the determinate time;

determining whether $T_{next}+N<t$, where $T_{next}$ is a next execution time and N is one execution time for the fixed step execution module;

if $T_{next}+N<t$, returning the retrieved oldest event to the queue, causing the fixed step execution module to execute through computer processing a fixed number of steps from the time $T_{next}$, causing an internal state to be saved following execution of the fixed number of steps, and incrementing the time $T_{next}$ by N;

if $T_{next}+N$ is not $<t$, determining whether if $T_{next}<t$;

if $T_{next}<t$, causing the variable step execution module to execute through computer processing from $T_{next}$ to t, inserting a new entry resulting from execution of the variable step execution module into the rollback table and setting if $T_{next}=t$, causing the fixed step execution module to execute though computer processing a fixed number of steps from the time $T_{next}$, causing an internal state to be saved following execution of the fixed number of steps, and incrementing the time $T_{next}$ by N;

if $T_{next}+N$ is not $<t$, determining whether there is an event having a timestamp $t_k$ in the rollback table wherein $t=t_k$;

if there is no event in the rollback table wherein $t=t_k$, deleting all entries in the rollback table back to the determinate time, executing the variable steps module up to the time t, inserting a new entry into the rollback table to set $T_{next}=t$, causing the fixed step execution module to execute through computer processing a fixed number of steps from the time $T_{next}$, causing an internal state to be saved following execution of the fixed number of steps, and incrementing the time $T_{next}$ by N, and if there is an event in the rollback table where in $t=t_k$, comparing by a local scheduler of the physical unit simulator, an event e retrieved from the queue with an event $e_k$ in the rollback table, wherein the event has a time $t_k$, wherein the global scheduler determines a successful speculative execution of the physical unit simulator upon determining that $e=e_k$.

11. The method of claim 10, further including:

deleting all entries in the rollback table back to the determinate time, executing the variable step module up to the time t, inserting a new entry into the rollback table to set $T_{next}=t$, causing the fixed step execution module to execute through computer processing a fixed number of steps from the time $T_{next}$, causing an internal state to be saved following execution of the fixed number of steps, and incrementing the time $T_{next}$ by N if the event e does not equal the event $e_k$.

* * * * *